US007496654B2

(12) United States Patent (10) Patent No.: US 7,496,654 B2
Corbin et al. (45) Date of Patent: Feb. 24, 2009

(54) MULTI-THREADED SYSTEM FOR ACTIVATING A PROCESS USING A SCRIPT ENGINE AND PUBLISHING DATA DESCRIPTIVE OF THE STATUS OF THE PROCESS

(75) Inventors: Lyle S. Corbin, Bothell, WA (US); Joseph A. Porkka, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1513 days.

(21) Appl. No.: 09/895,954

(22) Filed: Jun. 29, 2001

(65) Prior Publication Data

US 2003/0005110 A1    Jan. 2, 2003

(51) Int. Cl.
*G06F 15/173* (2006.01)
(52) U.S. Cl. .................. 709/224; 718/100; 718/107; 358/1.15
(58) Field of Classification Search .......... 709/224, 709/237, 223, 203, 204; 358/1.15, 1.14; 707/104.1; 718/100, 102, 104, 107, 108; 717/171; 715/201
See application file for complete search history.

(56) References Cited

U.S. PATENT DOCUMENTS

| | | | | |
|---|---|---|---|---|
| 5,550,986 | A * | 8/1996 | DuLac | 710/100 |
| 5,978,560 | A * | 11/1999 | Tan et al. | 358/1.15 |
| 6,222,530 | B1 * | 4/2001 | Sequeira | 715/201 |
| 6,389,446 | B1 * | 5/2002 | Torii | 718/100 |
| 6,535,295 | B1 * | 3/2003 | Brossman et al. | 358/1.15 |
| 6,622,155 | B1 * | 9/2003 | Haddon et al. | 718/100 |
| 6,631,009 | B1 * | 10/2003 | Thomas et al. | 358/1.15 |
| 6,639,687 | B1 * | 10/2003 | Neilsen | 358/1.14 |
| 6,826,607 | B1 * | 11/2004 | Gelvin et al. | 709/224 |
| 6,842,898 | B1 * | 1/2005 | Carlson et al. | 718/100 |
| 6,879,995 | B1 * | 4/2005 | Chinta et al. | 709/204 |

(Continued)

OTHER PUBLICATIONS

MacFarlane, A., et al., "PLIERS: A Parallel Information Retrieval System Using MPI", in *Recent Advances in Parallel Virtual Machine and Message Passing Interface*, pp. 317-324, 1999.

(Continued)

*Primary Examiner*—Dustin Nguyen
(74) *Attorney, Agent, or Firm*—Microsoft Corporation

(57) ABSTRACT

The invention relates to a method and system for accessing the status of a process executing either locally or remotely. The invention also involves a process management system that invokes an executable process, monitors it, and exchanges status information relative to the process with one or more connected machines. A local or remote application or machine invokes the process by communicating with the process management system over an established connection. The process management system invokes the requested action on the user's behalf by activating a script engine containing a sequence of executable commands and/or routines that initiate and enable the process. Status information related to the invoked action is consistently stored in a publicly accessible data structure as the process is in execution. Any machines that are connected with the process management system over the established connection can retrieve the data structure containing the process information. Because the method of invoking the process and retrieving the status information is not dependent upon the explicit mechanisms of the source code used to implement the process, the invention can be used in relation to any type of process.

37 Claims, 6 Drawing Sheets

U.S. PATENT DOCUMENTS

| | | |
|---|---|---|
| 7,058,945 B2 * | 6/2006 | Ichinose et al. ............. 718/102 |
| 7,069,551 B2 * | 6/2006 | Fong et al. .................. 717/171 |
| 2002/0083166 A1 * | 6/2002 | Dugan et al. ................ 709/223 |
| 2002/0133504 A1 * | 9/2002 | Vlahos et al. ............ 707/104.1 |
| 2002/0136390 A1 * | 9/2002 | Lang et al. .................. 379/222 |
| 2002/0165961 A1 * | 11/2002 | Everdell et al. ............. 709/225 |
| 2004/0054630 A1 * | 3/2004 | Ginter et al. .................. 705/53 |

OTHER PUBLICATIONS

Deschner, Dominik, et al., "Agent-Supported Information Retrieval for Tracking and Tracing", in *Cooperative Information Agents II*, pp. 44-54, 1998.

\* cited by examiner

MULTI-THREADED SYSTEM FOR ACTIVATING A PROCESS USING A SCRIPT ENGINE AND PUBLISHING DATA DESCRIPTIVE OF THE STATUS OF THE PROCESS

REFERENCE TO APPENDIX A

A portion of the disclosure of this patent document, particularly Appendix A: Primary Class Implementations for the Multi-threaded Process Management System, contains material subject to copyright protection. The copyright owner has no objection to the facsimile reproduction by anyone of the patent document of the patent disclosure, as it appears in the U.S. Patent and Trademark Office patent files or records, but otherwise reserves all copyright rights whatsoever.

TECHNICAL FIELD

In general, the invention relates to the retrieval of information descriptive of the status of a process, and more particularly, to network-based systems for accessing the information related to the status of any computer executable process executing either locally or remotely.

BACKGROUND OF THE INVENTION

Nowadays, almost all computing devices within the workplace are tied to a network. Many large and small companies alike employ a network to disseminate information throughout the organization. Typical uses of networks include linking multiple computers throughout the organization together, providing access to company wide information via a corporate intranet or the Internet, and connecting multiple computers to a specific printer or fax machine. The pervasive use of networks within the workplace can also be seen frequently within many households, where computers are commonly linked to a network, such as the Internet, to provide WEB access and e-mail messaging services.

In networked computing environments such as those described above, it is often desirable for a user to determine the status of a process that was initiated by their computer, such as the status of a document sent to a remote printer. According to many conventional computing systems, the status of the print job can be easily determined and even viewed with a simple network printer status tool that monitors the printing process as it is in action. Many other types of processes can also be initiated and monitored via a network in a well-known and conventional manner, as long as the tool used to communicate the status information is written specifically for that process. In the example of the print job, to communicate print status, the tool performing this action is programmed specifically for this purpose. The same print status tool cannot communicate the status of other tasks such as the delivery of an e-mail message or the detection of a computer virus. Thus, the client that invoked the print job status tool cannot use the same tool to view the status of a separate and independent process.

Because of this limitation, obtaining status information related to one or more independent processes requires a customized tool for each individual process. This requirement is undesirable, however, in situations where the overall process involves multiple independent sub-processes, such as in a distributed computing/networking environment.

The distributed compilation of a large software program provides a good example of how related, yet independently executed processes or tasks can occur within a distributed computing environment. In this example, several developers, often from different groups within an organization, share the responsibility of successfully compiling a software application. This procedure requires that each developer compile their developed source code, and then they must merge their code with that of the other developers to yield a fully operational end product. In order to successfully accomplish this, each developer must be able to monitor any one of the distributed compile processes at any time (i.e., another developer's compile process). However, due to the limitations imposed by conventional monitoring systems, there is no easy way for developers to monitor the status of each independent process in execution. The developer is only able to obtain the status information relative to his or her own compile process.

To overcome the limitations of conventional status information retrieval systems, a convenient means of determining the status of one or more independently executing processes is required. Also, a convenient means of retrieving status information related to the executable processes from any location is needed.

SUMMARY OF THE INVENTION

The present invention fulfills these requirements by employing a multi-threaded process management system that maintains consistent status information related to an executable process, and facilitates the exchange of the information between machines over a network. The information is collected by the process management system throughout the execution of the process and stored in a retrievable data structure. Any machine having access to the network can communicate with the process management system, and subsequently retrieve the data structure containing the status information.

Another feature of the invention allows a local or remote user to invoke a process by communicating with the process management system from over a network. The process management system invokes the requested action on the user's behalf by activating a script engine that interprets a sequence of executable script commands and/or routines that initiate and enable the process. The status information related to the invoked action is subsequently stored in a publicly accessible data structure as the process is in execution. Because the method of invoking the process and retrieving the process information is not dependent upon the process itself, the invention can be used in connection with any computer executable process.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
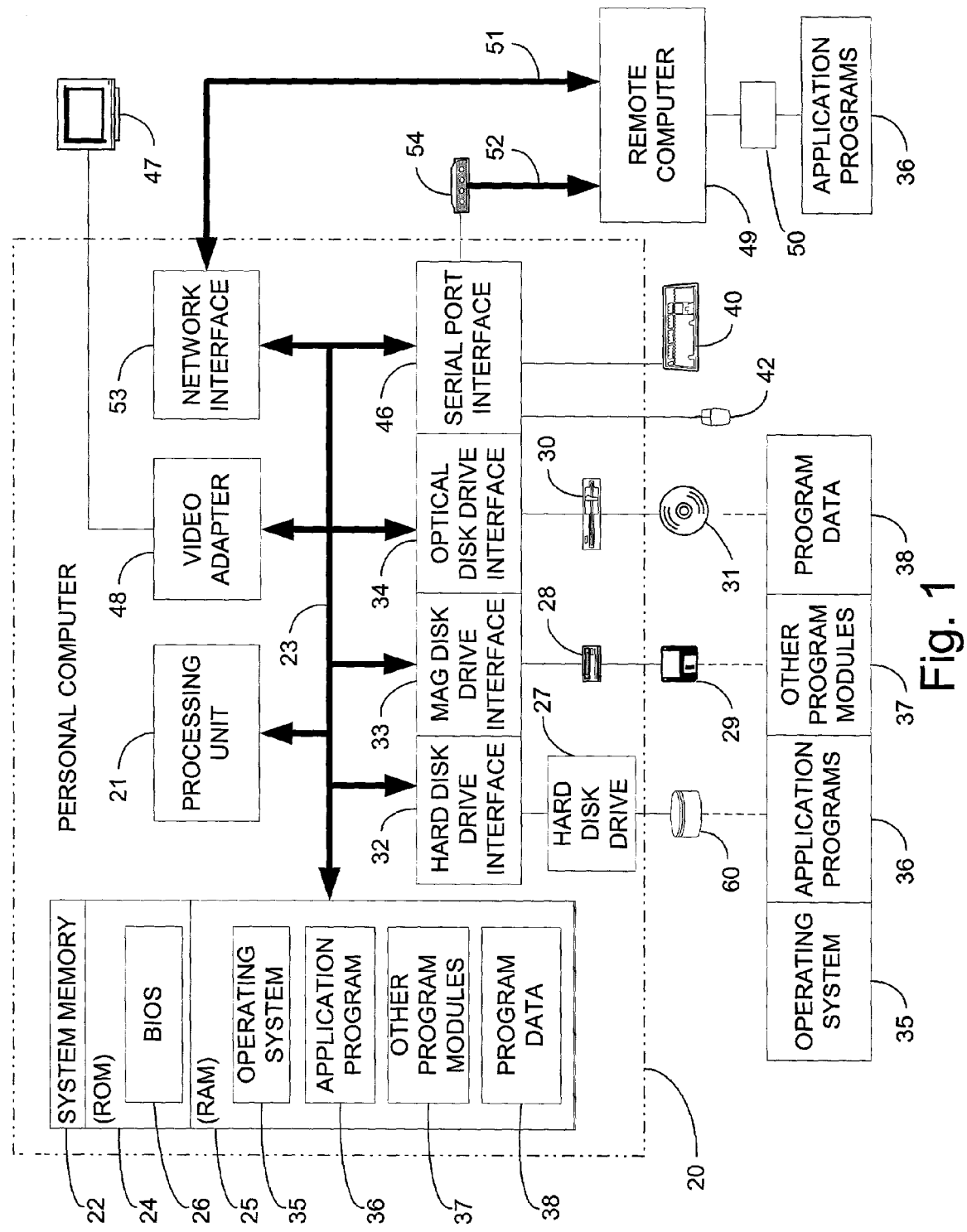
FIG. 1 is a block diagram generally illustrating an exemplary computer system on which the present invention resides.

Turning to the drawings, wherein like reference numerals refer to like elements, the invention is described hereinafter in the context of a computing environment. Although it is not required for practicing the invention, the invention is described as it is implemented by computer-executable instructions, such as program modules, that are executed by a PC (PC). Generally, program modules include routines, programs, objects, components, data structures and the like that perform particular tasks or implement particular abstract data types. In the illustrated embodiment described in detail herein, the various program modules or routines employed by the invention will be described according to the Microsoft Component Object Model (COM) and Distributed Component Object Model (DCOM). As is well known in the art, COM is an object oriented specification and software development methodology that allows independent program modules, or components, to connect and interact with relative ease. Likewise, DCOM extends the capabilities of COM by providing remote processing capability to COM object. However, while the invention will be described in the context of COM and DCOM embodiment, the invention is not meant to be limited to any specific architecture. The invention may be implemented according to other methodologies or protocols such as COBRA (Common Object Request Broker Architecture), SOM/DSOM (Distributed System Object Model), or the Java-based Remote Method Invocation (RMI) protocol. Moreover, languages/methodologies based on modular or object-oriented programming such as C/C++, or those requiring procedural execution can also be used.

Although the invention is described hereinafter in the context of a PC-based embodiment, other hardware environments may also make use of the invention. For example, the invention may be practiced in hand-held devices, multi-processor systems, microprocessor-based or programmable consumer electronics, network PCs, minicomputers, mainframe computers and the like. The invention is also well suited for use in distributed computing environments, where tasks are performed by remote processing devices that are linked through a communications network. In a distributed computing environment, program modules may be located in both local and remote memory storage devices.

While the invention may be incorporated into many types of computing environments as suggested above, the following detailed description of the invention is set forth in the context of an exemplary general-purpose computing device in the form of a conventional PC 20.

The Exemplary Computing Environment Computing Environment

Before describing the invention in detail, the computing environment in which the invention operates is described hereinafter in connection with FIG. 1.

The PC 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the PC 20, such as during start-up, is stored in ROM 24. The PC 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the PC 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the PC 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, PCs typically include other peripheral output devices, not shown, such as speakers and printers.

The PC 20 may operate in a networked environment using logical connections to one or more remote computers, such as a remote computer 49. The remote computer 49 may be another PC, a server, a router, a network PC, a peer device or other common network node, and typically includes many or all of the elements described above relative to the PC 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet. As will be discussed later on in greater detail with regards to the invention, the remote computer 49 is a primary node on which a process management system executes.

When used in a LAN networking environment, the PC 20 is connected to the local network 51 through a network interface or adapter 53. When used in a WAN networking environment, the PC 20 typically includes a modem 54 or other means for establishing communications over the WAN 52. The modem 54, which may be internal or external, is connected to the system bus 23 via the serial port interface 46. In a networked environment, program modules depicted relative to the PC 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention accesses status information that is generated by one or more nodes as a result of the execution of a computer-executable process. As described herein, the executable process is any computer-executable code, routines or sequence of instructions that enable a specific task or action to be invoked by a computer. This includes simple tasks, such as the transferring of a file, or more complex tasks such as performing a complete build of a software product or controlling an electromechanical process. According to the methods of the invention, the process is implemented according to a standard scripting language, such as those defined by the ECMAScript standard. This includes script languages such as Microsoft JScript and VBScript, or Netscape/AOL JavaScript. The script language, or code, is then parsed and executed by a script engine, which is a script language interpreter that resides on the node responsible for executing the process. Also, the status information related to the executable process can be any data or parameters that are generated by the script code that enables the process. This includes information such as the current state of the process, the characteristics of the computer system in which the process is being run, data objects, arrays and any other data that can be put into a script variable. Because the process is implemented as executable script code, the status information that is generated is dependent upon the customized design of the script itself.

Figure 2:
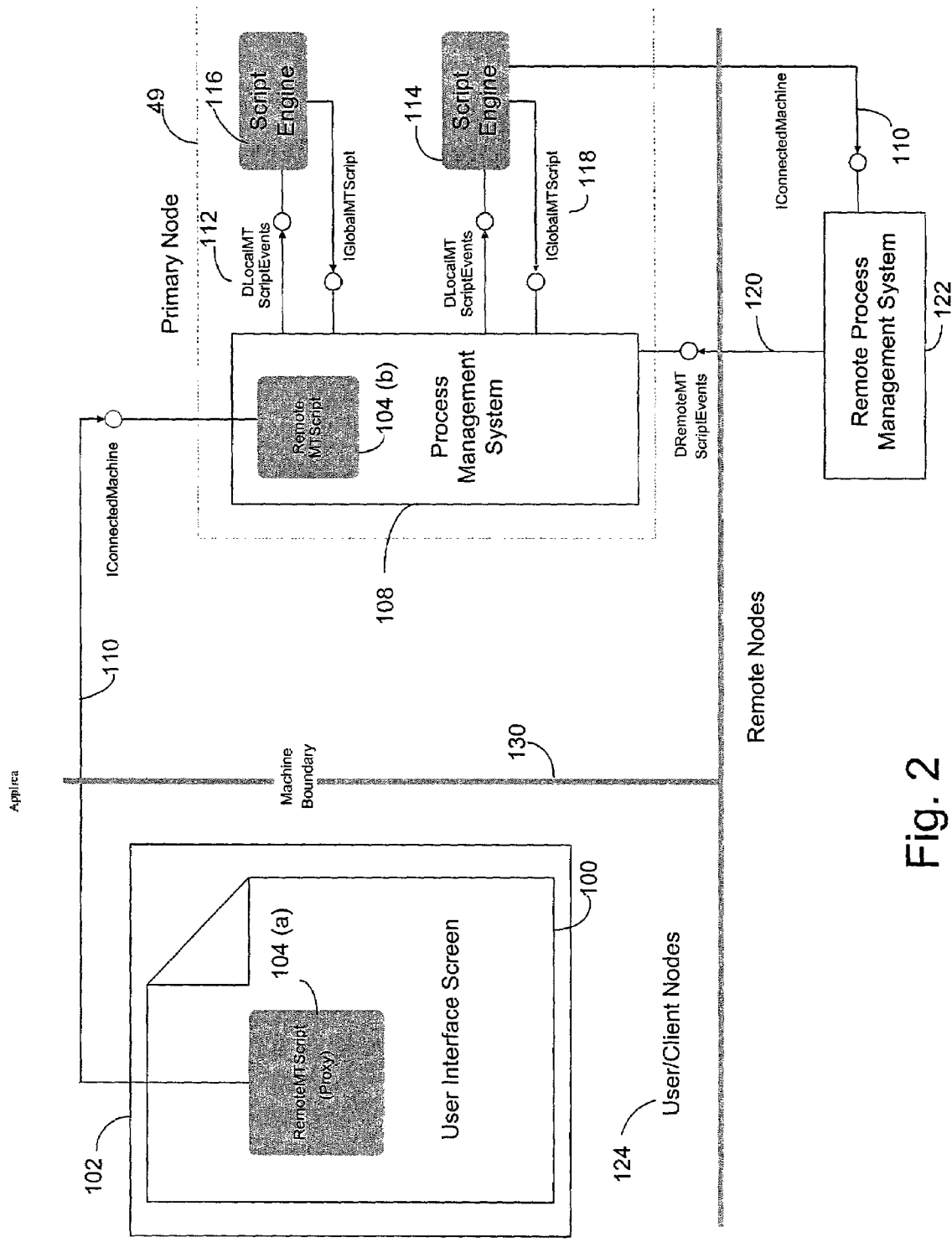
FIG. 2 is a high-level block diagram illustrating the overall architecture of the invention.
Figure 3:
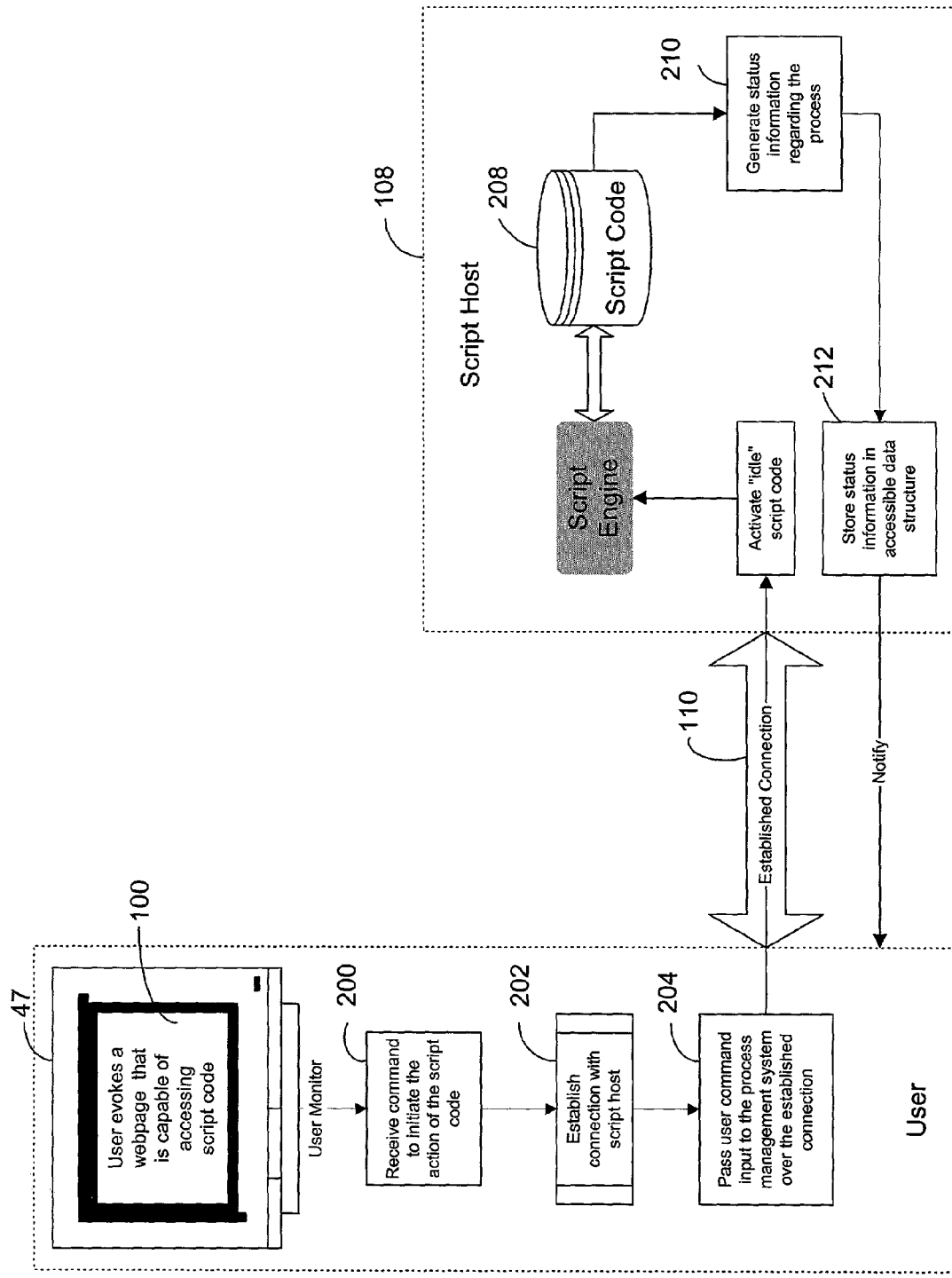
FIG. 3 is a simple flow chart illustrating the interaction between the user interface and the process management system to invoke an executable process.

Turning to FIGS. 2 and 3, a user interface 100, executing on a personal computer such as that shown in FIG. 1, is capable of communicating with a remote computer 49 over an established network connection 51/52. The user interface 100 is best characterized as the portion of a computer application that displays useful information to the user. For instance, many Windows-based applications employ a graphical user interface having various menus, display objects and buttons that represent specific features of the application. In general, the user interface 100 contains text, graphical objects and/or instructions that allow the user of the computer 20 to perform various tasks. Virtually any computer-implemented process or application that renders the display of text or images to a monitor 47 for performing a task is a user interface, and falls within the scope of the invention.

In the illustrated embodiment, the user interface 100 is a web page. The web page is generated by a web browser application 102, which is capable of processing web-based content (including script code) received from over a network 51/52, and displaying text and graphical information to the user from the monitor 47. Embedded within the web page 100 is an Active X object, referred to as the RemoteMTScriptProxy object 104(a), that employs Active Scripting technology. Active Scripting is a well-known technology that allows a script engine to be encapsulated into a COM object, such as an Active X object. The RemoteMTScriptProxy object 104(a) enables script code contained within the web page 100 to communicate with other machines or objects remotely. In particular, the script code is written to perform remote processing tasks. One such task is to establish a connection with a remotely located primary node 106, on which a process management system 108 resides. Another task is to invoke the execution or action of a process that is maintained by the process management system 108. As discussed previously, the process is written in executable script code. In order to activate this code, which resides within a physical memory location on the primary node 49, the user interface 100 must submit a request to the process management system 108 (event 204). The user interface accomplishes this by accepting a command to activate the process as input (event 200). The command is input into the user interface screen manually by a user of the Web browser 102, such as by clicking an action button embedded within the user interface 100 with the mouse 42. Clicking the action button results in the initiation of the script code contained within the web page 100, which in turn activates the RemoteMTScriptProxy object 104(a) to communicate with the primary node 106. While not shown in FIGS. 2 or 3, the command can also be entered from a command line entry field that implements the connectivity of the RemoteMTScriptProxy object 104(a). Or, as another alternative, the command can be input without human intervention by a separate application or process that called the user interface. Any means by which the desired process or action to be invoked is specified to the user interface screen is acceptable. The input command also includes descriptive parameters that are necessary to properly execute the process. For instance, a command to execute a process for transferring a file from one location to another must include other descriptive parameters/ information such as the name of the file to be transferred, its current location, and the desired location.

The other task of the user interface is to establish a COM/DCOM connection with a process management system 108 executing on a primary node 106. The process management system 108 performs numerous tasks, which include storing status information related to the executable process, managing multiple script threads, processes, and script engines 114/116, and maintaining connections with one or more user interfaces 100 or remote machines 122. The full architecture and operation of the process management system is discussed in greater detail hereinafter. The process management system provides a means by which any computer executable process can be implemented, accessed, and maintained within a distributed or non-distributed processing environment.

With reference again to FIG. 2, once the user command is received by the user interface 100, it is processed, and a connection with the process management system 108 is established by activating the script code contained within the web page 100 (event 202). As is commonly known in the art, COM/DCOM allows remote and local applications to interact with each other and the operating system upon which they execute through collections of function calls known as interfaces. The established DCOM connection implements the IConnectedMachine interface 110, which allows the user of the web page 100 to communicate with and access information directly from the process management system 108.

Once the IConnectedMachine interface 110 is created, the command received by the user interface 100 is transmitted to the process management system 108 (event 204). As shown in FIG. 2, the process management system implements a RemoteMTScriptStub object 104(*b*). This is an instantiated version of the RemoteMTScriptProxy object 104(*a*), and enables the remote communication abilities of DCOM. The command is received by the RemoteMTScriptStub 104(*b*), which in turn activates the DLocalMTScriptEvents interface 112. This interface activates one or more script engines 114/116 to execute the script code contained within memory 50 that corresponds to the command—the desired process (event 206).

As the process is in execution, the script code communicates with the process management system via the IGlobalMTScript interface 118 (event 210). This interface allows the scripts in execution by the process management system 108 to send status information about the process to the process management system. The status information is then stored within a data structure (not shown) that is maintained by the process management system (event 212). The IGlobalMTScript interface 118 is also used by the scripts to notify the process management system 108 of events that occur during process execution, such as the occurrence of an error or the completion of the process. To further facilitate the exchange of information, any remote machines 122 connected to the process management system through the IConnectedMachine interface 110 will send event notifications via the DRemoteMTScriptEvents interface 120. This is the primary interface that the connected machines 122 use to communicate with the process management system.

A critical feature of the invention is the ability to allow one or more nodes to access the status information generated by the scripts in execution from over the network. Any machine having the appropriate access to the network upon which the primary node 49 is located, can access the process management system, and thus access the status information. Appropriate access refers to the ability of the machine to penetrate a network security infrastructure that may be in place within the network of the primary node 49. Machines that are capable of connecting with the process management system 108 can poll it for data using a standard polling mechanism, or can explicitly request the data from a user interface 100; and subsequently receive the data structure containing the status information. FIG. 2 and the flowchart of FIG. 4 further illustrate the interaction that takes place between the process management system 108, and any connected nodes 122 and 124 to provide this ability.

The machine boundaries 130 as shown in FIG. 2, indicate the locality of the various nodes that are capable of connecting with the process management system through the IConnectedMachine interface 110. In one instance, one or more user/client nodes 124 can connect with the process management system through a user interface 100 such as a web page. This method of accessing the process management system was discussed in foregoing paragraphs of the description. In another instance, one or more remote nodes 122 can connect to the process management system 108 on the primary node 49. This method of accessing the process management system does not require a connection being established from that user interface 100. Instead, the script code within memory 50 on the primary node is capable of formulating connections with other process management systems executing on one or more remote nodes 122. The following paragraphs further describe this ability.

Script code can be written to connect directly to COM/DCOM objects. Because of this ability, the script code that is executed by the process management system 108 on the primary node 49 can in turn connect to other process management systems executing on the one or more remote nodes 122 by formulating a DCOM connection, and implementing the IConnectedMachine interface 110. The remote nodes have the same general internal architecture as that of the primary node 49. Each has a process management system 108, a local memory for accessing executable script code, and one or more script engines for processing and interpreting executable scripts. However, each node contains a different set of script code that performs a different task than that of the primary node, and contains different script engines for executing this code. Thus, the executable process can be executed solely by the primary node, as illustrated in FIG. 3, or can be distributed amongst a plurality of independent nodes over the network as illustrated in FIG. 4.

Figure 4:
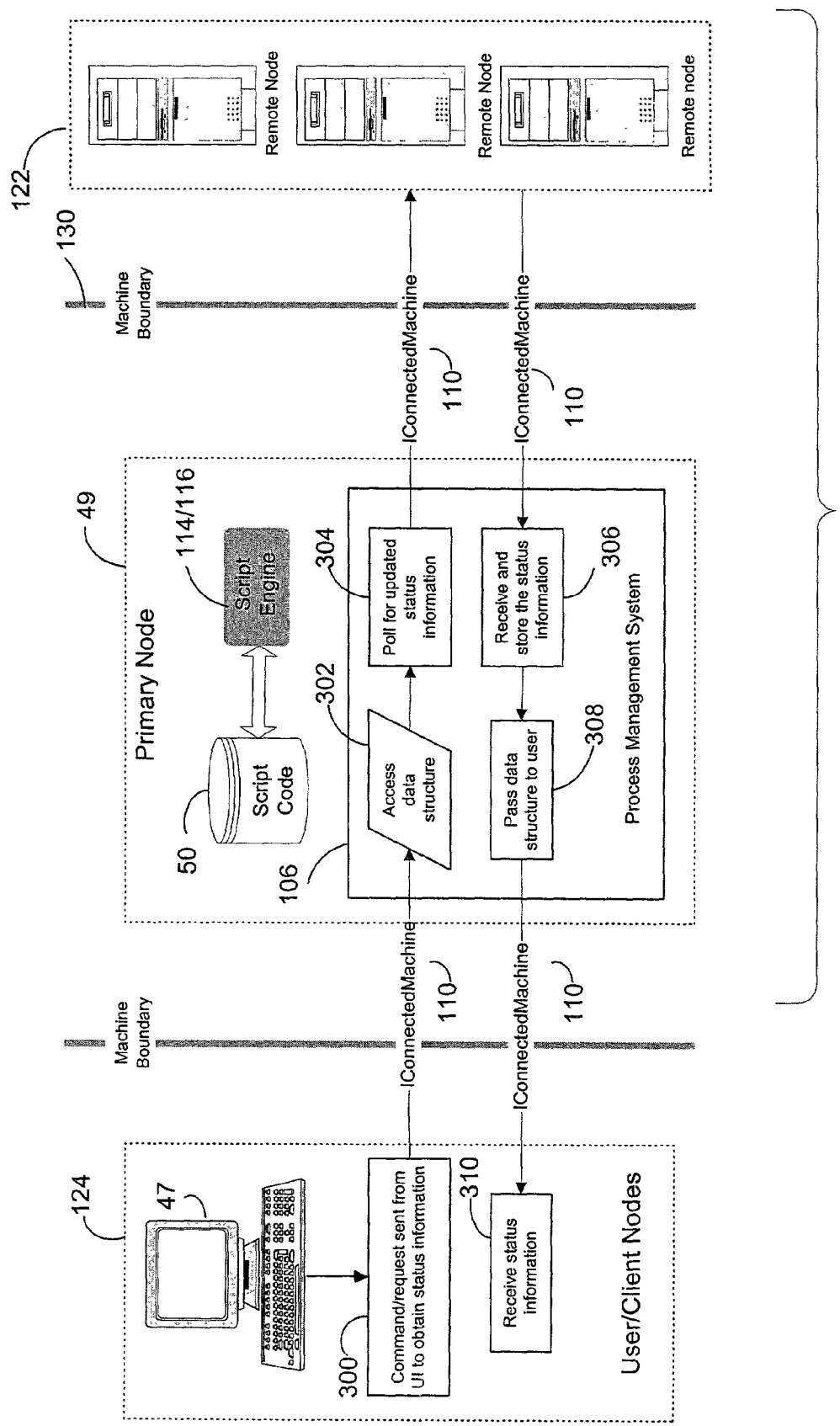
FIG. 4 is a flow chart illustrating the interaction between the user interface and the process management system to obtain status information related to an executable process distributed amongst a plurality of nodes over the network.

With reference to FIG. 4, the user/client nodes 124 that connect through the user interface 100 obtain status information related to the executable process by polling the process management system 108 on the primary node 49 (event 300). Once this request for information is received by the process management system through the IConnectedMachine interface 110, the process management system accesses the data structure that it maintains during the execution of the process (event 302). As discussed previously, the script code in execution on the primary node updates this data structure consistently. Yet, when the process is distributed amongst a plurality of nodes, each of the nodes store status information generated by the scripts into its own data structure. Therefore, in order to return complete process information to the user, the process management system 108 on the primary node must be able to obtain status information from all of the nodes 122 that execute the overall process.

To accomplish this, the process management system 108 consistently polls the one or more remote nodes 122 for updated information over the IConnectedMachine interface 110 (event 304). Upon receiving the request, the one or more remote nodes pass the information stored within their respective data structures to the primary node. This information is then stored into the data structure on the primary node, and sent to the requesting user/client node 124 (events 306, 308 and 310). Because the scripts are able to formulate connections with other process management systems, data can be easily exchanged between a plurality of nodes within a distributed network. Each machine communicates with the next via the IConnectedMachine interface 110, and event notifications are fired to each machine using the DRemoteMTScriptEvents interface 120. Furthermore, the connections enable the plurality of nodes to submit commands and/or requests to invoke the action of the executable process, thus increasing the ability of the nodes to work together to perform complex tasks.

Figure 6:
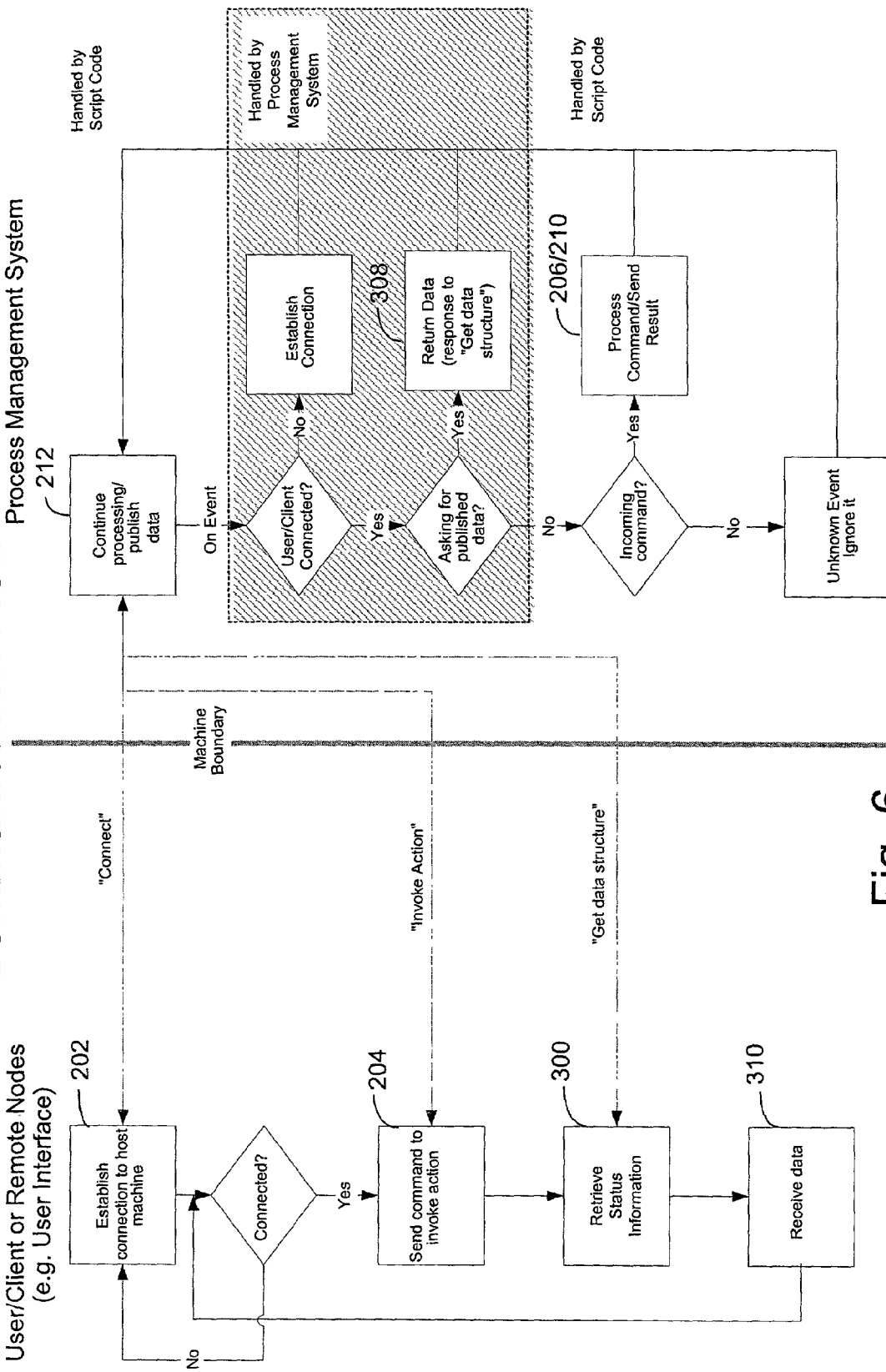
FIG. 6 is a flow chart illustrating the overall process of communication between the user interface and the process management system.

The flowchart of FIG. 6 summarizes the steps illustrated in FIGS. 3 and 4, and shows the overall communication flow of the invention. Specifically, it shows the logical steps that are taken by the process management system and a user/client 124 or remote node 122, to facilitate the exchange of status information. Moreover, it illustrates the sequence of steps that are taken by the user/client nodes 124 and/or remote nodes 122 to connect to the process management system and invoke the executable process. As shown, the process management system 108 responds to various requests and commands received from the user, and responds accordingly. Certain events are handled directly by the script code that implements the process, while other events are handled by the process management system itself.

To promote a better understanding of the invention, a detailed description of the internal architecture of the process management system is described below. While the general description is in the context of specific class names, objects, and function calls implemented using COM/DCOM, the invention is not meant to be limited to the particular implementation disclosed herein. Those skilled in the art will recognize that the invention can be implemented according to various programming techniques and methodologies. The process management system will be discussed with reference to the block diagram of FIG. 5.

The process management system is a computer executable application that resides upon a primary node 49, and is capable of executing multiple script threads. Scripting threads are simply threads that execute according to a scripting language, such as JavaScript, VBScript or PERL. Programmers often prefer to use scripting languages rather than compiled languages because scripting languages provide an easy means of executing source code that avoids many of the complexities of the operating system. For instance, scripts are interpreted and processed directly by a separate program called a script engine 114/116, and so do not need to rely explicitly on the message passing facilities of the operating system in order to execute, as in some machine executable languages One of the primary purposes of the process management system 108 is to provide a platform upon which any computer executable process can operate. To achieve this, the process to be executed cannot rely upon the process management system to interpret, compile or process the source code that defines the process. With this requirement in mind, a customized set of script code that is written to perform a specific task or procedure, is used to implement the process. The process management system 108 is only responsible for providing the means of activating the script code, monitoring it during its execution, and sharing status information generated by the script code. Thus, the process management system is not designed specifically for the particular executable process, but is instead a framework upon which any process can be executed. It does not execute the process (interpret the source code) directly, but simply hosts one or more script engines for interpreting executable scripts. Furthermore, the process management system does not require any process specific mechanisms to collect and retrieve status information. It simply implements interfaces that allow data to be exchanged without regard to the methods or functions of the source code that implements the process. For these reasons, the invention is suitable for executing any process.

The process management system 108 is comprised of various inter-dependent components for performing various tasks. Because one of the primary functions of the process management system is to provide multi-threaded scripting behavior, a base thread-aware class provides the basic building blocks for the components of the process management system. This base class, named CThreadComm, provides all the basic behaviors of a script thread, including creation, initialization, cross-thread communication (both synchronous and asynchronous), and thread locking for cross-thread data access, Derivative classes of CThreadComm include, but are not limited to, CMTScript 406, CMachine 420, CProcessThread 424 and CScriptHost 408. Each of the classes implements a different thread, or object, of execution within the process management system. This offers a distinct advantage over other scripting technologies, such as Windows Script Host, which does not support multi-threaded execution.

Threads communicate to each other using mechanisms provided by CThreadComm. These mechanisms are similar to the way the Windows operating system handles window messages. For instance, CThreadComm implements a SendToThread( ) method that sends a synchronous message and waits for a response. If asynchronous notification is desired, then an object can use PostToThread( ). Both objects participating in the communication must derive from CThreadComm. Also, to further support multi-threaded operation within the process management system, each of the classes of CThreadComm provides different levels of functionality and threaded behavior. The definitions and coded based implementations of these classes are shown in Appendix A.

Figure 5:
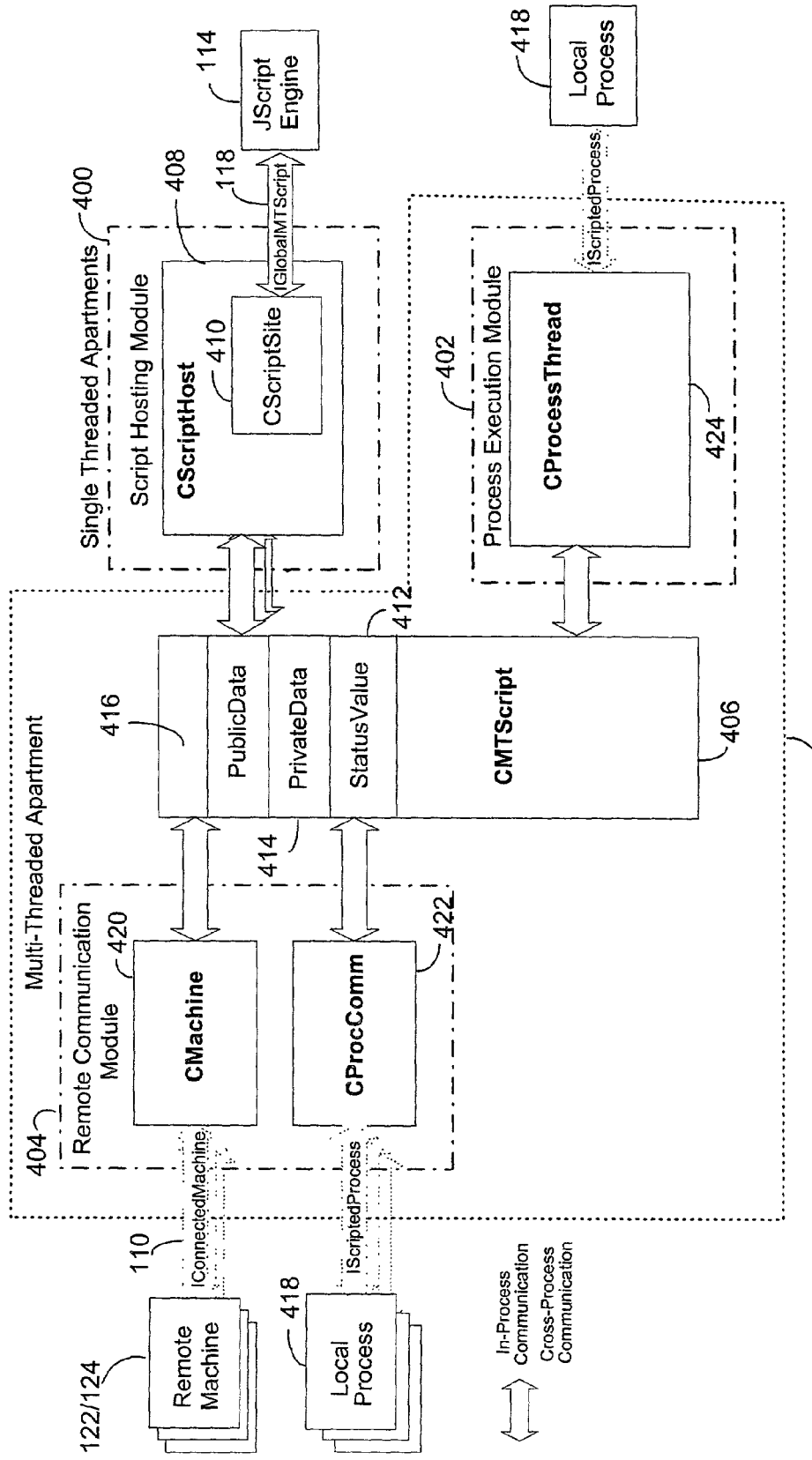
FIG. 5 is a block diagram illustrating the basic components of the process management system and the interactivity between the various components.

In FIG. 5, the various components that comprise the process management system are shown. The primary components are the script hosting module 400, the process execution module 402, the remote communication module 404, and the CMTScript module 406. A description of each of the components follows.

Script Hosting Module

The script hosting module 400 is the part of the process management system that manages the script engines 114 and multiple threads of script execution. It also provides behavior to the script engines that gives them extended capability. Some of this additional behavior includes the ability for the scripts in different threads to communicate, spawn new script threads, and other extended tasks beyond the normal capabilities of the script engine. The script hosting module contains three major components: 1) source code designed for managing and hosting one or more Active Script engines, 2) implementation of the IGlobalMTScript interface 118, and 3) code that fires events into the appropriate script engines using the DLocalMTScriptEvents interface 112.

The process management system integrates with the script engine 114 via the CScriptHost class 408. When this class is called, due to a request to execute script code, it takes a path to the script file that corresponds to the request. The process management system then instantiates the appropriate script engine 114 to enable the process. One of the requirements of Active Script engines is that they be provided a script site, which is simply an object on which function callbacks can be made. CScriptHost creates a CScriptSite class 408 and passes this object to the script engine. The process management system then loads the script file that corresponds to the desired process to be executed, and passes it to the script engine. The script engine parses the script file, executes global code, and returns. In most cases very little is done at this stage besides initializing global variables.

The actual execution of meaningful code is not performed until the ScriptMaino event (an event defined by the process management system, not Active Scripting) is fired. This is because of the way in which the script engine operates. By convention, the script engine cannot be transitioned to the CONNECT (ready to execute) state until it has returned from the initial parsing of the script, and the engine must be in the CONNECT state for event firing to work. At this point the script engine is transitioned to the CONNECT state, which hooks up the DLocalMTScriptEvents interface (described below). Then the ScriptMain( ) event is fired, which is when the script performs all of its behavior. Once ScriptMain( ) returns, the script is considered finished and is shut down and deleted.

The process management system has what is called a "primary" script (not shown). It is the only script for which the user tells the process management system its location. The primary script is automatically loaded by the process management system when it is initiated, and if a failure happens finding, loading, or parsing this script then the process management system reports the error and terminates. All other scripts are spawned by the primary script using methods on IGlobalMTScript 118. Thus, requests to activate the executable process and other events are fired into the primary script first. The primary script then activates the specified script engine through the DLocalMTScriptEvents interface 112 to begin process execution. Once this script is fully executed, ScriptMain( ) is returned to signal the termination of the process, and the script is deleted. However, unlike other scripts, the primary script does not terminate when it returns from ScriptMain( ).

If the primary script terminates (with an error, for example), then the process management system cannot continue and subsequently terminates. Script errors are reported by the script engine 114 to the process management system 108 via the script site 410. Once a script error occurs, then that script can no longer execute and must be terminated. The process management system 108 gives the script a chance to clean things up and log the error by firing another method implemented by the process management system, OnScriptError( ), before terminating the script. The script can choose whether the error should be reported to the user.

As discussed previously, the script hosting module 400 provides behavior to the script engines that gives them extended capability. While Active Script engines 114 allow users to write and execute script logic, more complex behavior such as launching other processes or threads is not provided by the script engine itself. For Active Scripting, this type of behavior must be provided by the process management system or by creating COM objects that can be used directly by the script engine. In the present invention, this extended behavior is provided by the process management system according to a global object property (not shown). Specifically, when an Active Script engine 114 encounters an identifier within the script code, such as a function name or variable that it cannot resolve, it will check with the global object to see if it can provide that function or variable. In this way, executable tasks or functions that are not generally capable of being performed by the script engine 114 can be performed. By using the global object, the process management system 108 is able to allow scripts to spawn other scripts, send email, synchronize with each other, launch processes, etc. The software developer can customize the functions or variables provided by the global object to fit their specific requirements. Also, the global object implements the IGlobalMTScript interface 118 to allow the process management system 108 and the script engine 114 to interact.

Process Execution Module

The process execution module 402 is the part of the script host that handles the execution and monitoring of local processes on the machine. Local processes can be any executable applications, functions, or the like that reside within the application program space 36 or a memory location 50 on the primary node 49. Any of the scripts can launch a local process by calling the global object. The script specifies whether the process should be executed synchronously or asynchronously, whether its window should be minimized or not, whether to capture its output, etc. The process execution module spawns the local process, monitors it, and reports status information back to the script. This status information is kept around for some time after the process terminates. This allows the script to have access to the captured output and exit code of the process even after it has terminated. Once a dead process is purged, then attempts to obtain the exit code will fail with an invalid parameter error.

Remote Communication Module

Along with allowing multi-threaded scripts and rich execution of local processes, the third main goal of the process management system is to make it easy to obtain and share status information with other machines within a distributed network environment. To accomplish this, the process management system 108 registers DCOM objects on the machine that can be instantiated (communicated with) on other machines.

When the process management system is run, it registers the RemoteMTScriptStub 104(*b*) as a remotable object. This object implements IConnectedMachine 110 and has DRemoteMTScriptEvents 120 as an event interface. As a remotable object, other machines can instantiate the object and communicate to it over the network. As is commonly known in the art, DCOM allows the object to be communicated with as if it were on the primary node 49 even when it is on a remote node 122/124 (both local and remote communication are possible). Once the object is called, the remote node has full access to the IConnectedMachine 110 and DRemoteMTScriptEvents 120 communication interfaces. If the object is called from a user interface such as the HTML-based interface of FIG. 2, the RemoteMTScriptProxy object 104(*a*) must be used to facilitate the communication interfaces. Those skilled in the art will recognize however, that other types of user interfaces can be used which do not require the usage of the RemoteMTScriptProxy object 104(*a/b*). For example, a Win32 based user interface can be programmatically designed to facilitate the remote communication without the need for a proxy object. Nonetheless, the user interface 100 as shown in the illustrated embodiment is capable of processing Web-based content.

IConnectedMachine 110 is the interface implemented by the Remote Communication Module 404 that allows remote nodes 122/124 to access the process management system. Through this interface, the remote machine can perform three tasks, which are 1) obtain information about the machine the process management system 108 is running on, 2) submit a request to activate an executable process to the primary script, and 3) retrieve the data structure that contains status information related to the executable process. The information about the process management system 108 includes the OS, platform, version, and any other system information that the connected machine may be interested in. As for the second task, a request to activate an executable process is submitted by the remote nodes 122/124 by calling the IConnectedMachine interface 110, and passing the command to invoke the action to the primary script. The primary script then invokes the scripts and script engines 114 that correspond to the request. It is up to the scripts to determine how to interpret the command and take the appropriate action to fulfill the request. With regards to the third task, the remote nodes 122/124 retrieve the data structure by accessing the process management system 108 through IConnectedMachine 110. As will be discussed later, the data structure that is sent can be a PublicData structure that contains complete status information, or a StatusValue data structure that contains information regarding a particular event.

As scripts are in execution, they can send information to any remote nodes 122/124 that are connected to the process management system 108 via IConnectedMachine. For example, the script can send a notification to a connected node to alert it that the data structure has changed, or that the executable process is complete. This can be done using the event interface DRemoteMTScriptEvents (not shown in FIG. 5 but in FIG. 2). The one or more remote nodes 122/124 wishing to receive notification of certain events give the process management system an event sink for DRemoteMTScriptEvents 120. Then, the script in execution can call the global object to send a message to any connected machines. If no machines are connected, the message is discarded.

CMTScript Module

The CMTScript module 406 is the main glue that connects all of the other components of the process management system 108 together. It acts as a liaison between the remote communication module 404 and the script hosting module 400 so that they can send messages to each other. Requests received over the IConnectedMachine interface 110 from the one or more connected nodes 122/124 or from local processes 418 are passed from the remote communication module 404 to the script hosting module 400 using the methods of CMTScript. The script hosting module also delegates certain tasks to the CMTScript module 406 such as the launching of the primary script, the running of processes, and the storage of data that is generated by the scripts. The CMTScript module also keeps track of all current and recently executed scripts and processes that are spawned during process execution. Furthermore, the CMTScript module handles command-line parameters and the program registry, and stores/loads the default configuration for the process management system 108 (*.exe).

During process execution, the scripts generate status information related to the executable process. To ensure that this information is shared between nodes, the process management system 108 maintains a data structure that is accessible to the one or more nodes 122/124 connected with the process management system 108. This data structure is called PublicData 416, and is implemented by the CMTScript module 406. Any data that a script puts into PublicData 416 is immediately accessible from a remote machine 122/124. This feature essentially allows the scripts to "publish" information about the task they are performing, or store data that they have obtained from some other source, etc. This can be data such as the current state of the process (idle, busy, completed) or the type of process in execution (master, slave, standalone). Any data whatsoever can be put into the PublicData structure; it is up to the scripts to determine what gets placed there. PublicData is the data structure that is returned to the user interface 100 or the remote nodes 122 when the process management system is polled for status information.

The CMTScript module 406 also provides two other data structures to facilitate the exchange of information between nodes. These are the StatusValue 412 and PrivateData 414 data structures. StatusValue 412 is similar to the PublicData structure in that it is visible to the one or more connected nodes 122/124 via the IConnectedMachine interface 110. However, the data is limited to only a maximum number of integer values n, where n is variable (by a software developer) according to the needs of the process management system. The advantage of the StatusValue 412 data structure is that it stores less information, and so can be retrieved by remote machines 122/124 much faster than the larger PublicData 416. For example, a script may want to simply provide an indication as to whether or not an error has occurred in its processing. Rather than send the complete set of status information to the user/client 124 via PublicData 416, the StatusValue data structure 412 can be sent/retrieved to indicate if an error happened (or perhaps show a count of errors). StatusValue provides a quick indication of an event that occurs during process execution, and can be quickly and efficiently retrieved by remote nodes.

Any script thread can read from or write to either of these data structures mentioned above, and all other script threads will be able to see the changes. Thus, PublicData and Private data are accessible remotely by one or more nodes, and locally by script threads in execution on the machine. The PrivateData data structure 414 differs from PublicData 416 and StatusValue 412, however, in that it is not accessible to the remote machines 122/124 via the IConnectedMachine interface 110. Instead, PrivateData is accessible to only the script threads that are spawned during process execution. PrivateData can be used by the script threads to store information that relates to the execution of the process, such as temporary information that was retrieved from other machines, data regarding what commands have been sent from a remote machine 122/124, or a list of remote machines 122/124 that are currently connected. The PrivateData data structure is useful for ensuring cross-thread communication between multiple script threads, particularly when the process is distributed amongst a plurality of nodes.

Overall, the present invention provides a means in which computer executable processes can be invoked and subsequently monitored by one or more nodes from over a network. The process is written in a scripting language that is executable by a script engine, and can be executed by a single primary node or distributed amongst a plurality of nodes tied to the network. By distributing the process amongst a plurality of nodes, the process is broken down further into a plurality of sub processes, where each sub process is independently executed by one of the plurality of nodes. This is desired in many situations to decrease the amount of time required to complete a full computer executable process by a single machine. Distribution of the process across multiple nodes also avoids the drainage of resources that occurs when a single machine is left to perform large scale computing tasks. The present invention provides an easy means by which the processes can be run independently, but monitored and executed dynamically from over the network.

Unlike conventional process monitoring systems, the process management system 108 operates independently of the executable process. In this respect, it operates regardless of the specific mechanisms, OS dependencies or methods of the programming language in which the process is implemented. Instead, it simply manages one or more script engines, which provide the ability to interpret and compile a process written in script. Another aspect of the invention is that the process management system 108 provides the necessary communication channels needed to exchange data generated by the scripts between nodes, interact with the scripts to store status information related to the executable process, and send notification of events to any connected machines. Still further, the present invention manages multiple scripts threads during the execution of the process, and provides mechanisms by which these script threads may communicate with each other, and other processes. These mechanisms are provided by a global object, which is an object that extends the capabilities of the scripting engines. This is necessary because some script engines (e.g. JScript) do not have any built in mechanisms to allow scripts to perform events that are extrinsic to the operation of the script code. Examples include the ability to call local processes, spawn new script threads, etc. Ultimately, the invention can be practiced in any situation where process execution and status information retrieval is to be accomplished from over a network.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those skilled in the art will recognize that the various components and mechanisms of the process management system as detailed in the figures can be implemented according to other programming methodologies, including but not limited to DSOM, COBRA, and RMI. Furthermore, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for accessing status information related to a process the method comprising:
   receiving a request from a client for status information related to the process, the process being initiated by another client;
   identifying nodes in a network, each of the nodes executing a distributed thread of the process;
   polling each identified node for status information associated with the thread executing by the node, the status information generated by a script associated with the process;
   receiving the status information from each of the nodes;
   storing the status information in a data structure; and
   enabling the client to access the status information;
   wherein the step of storing is performed by a process management system executing on a primary node; and the step of storing further includes placing the status information relative to the executable process into a status value data structure that is accessible to any node capable to accessing the process management system executing on the primary node.

2. The method of claim 1, further comprising:
   invoking one or more script engines to execute at least one script code that performs at least one action of the process;
   handling multiple script threads during the execution of the process.

3. The method of claim 2, wherein the one or more script engines are maintained by a process management system that executes on the nodes.

4. The method of claim 3, wherein the one or more nodes include a primary node.

5. The method of claim 1, further comprising making the data structure available to any node in the network capable of accessing a process management system in a primary node.

6. The method of claim 5, wherein the step of polling is performed by the process management system residing on the primary node over an established connection with the identified nodes.

7. The method of claim 6, wherein the identified nodes include the primary node.

8. The method of claim 1, wherein the step of storing further includes:
   placing the status information relative to the executable process into a private data structure by the process management system on the primary node, wherein the private data structure is accessible to only script threads that are spawned during the execution of the process.

9. The system of claim 1, wherein the status value data structure comprises data for providing an indication of an event that occurs during the execution of the process.

10. The method of claim 1, further comprising:
    establishing a connection between a process management system executing on at least one of the nodes and another process management system residing on a primary node, wherein the connection is established by a script code in execution by a script engine associated with the at least one node.

11. The method of claim 1, further comprising:
    establishing a connection between other client nodes and a process management system residing on a primary node, wherein the connection is established from a user interface executing on the other client nodes; and
    accessing the process management system from over the established connection by the user interface executing on the other client nodes.

12. The method of claim 11, wherein the step of establishing includes accepting a command as input by the user interface to establish a connection with the process management system executing on the primary node.

13. The method of claim 11, wherein the step of accessing includes accepting a command as input by the user interface to invoke the action of the executable process by the process management system from over the established connection.

14. The method of claim 11, wherein the step of accessing includes accepting a command as input by the user interface to poll the process management system for status information from over the established connection.

15. The method of claim 11, wherein the user interface receives messages from the process management system over the established connection.

16. The method of claim 15, wherein the messages contain information that is descriptive of the primary node.

17. The method of claim 15, wherein the messages contain information that is descriptive of a particular event that occurs during the execution of the process.

18. The method of claim 15, wherein the messages contain a data structure that is generated as a result of the execution of the script code by the one or more script engines to indicate the status of the executable process.

19. A system comprising:
    a computer microprocessor;
    a process management system executing on a primary node in a network, the process management system configured to collect status information associated with a process initiated by a first client the processing management system also configured to provide the status information to a second client, the processing management system also configured to divide the process into multiple threads and distribute the threads to multiple remote nodes in the network, the process management system further configured to receive the status information associated with the threads from each remote node and store the status information in a data structure accessible by any node with authorized access to the process management system; and the remote nodes in the network, each remote node processing at least one of the threads associated with the process and including a script configured to provide the status information collected by the process management system; wherein the process management system stores the information into a public data structure that is accessible to the one or more nodes capable of establishing a connection with the process management system.

20. The system of claim 19, further comprising one or more client node each configured with a user-interface, the one or more user interfaces configured to establish a connection over the network with the process management system executing on the primary node, the one or more user interfaces also configured to request the status information from the process management system and to process the status information when the information is received.

21. The system of claim 19, wherein the one or more user interfaces accept as input commands to establish a connection with the process management system executing on the primary node.

22. The method of claim 19, wherein the one or more user interfaces accept as input commands to invoke the action of the executable process by the process management system, and sends requests to invoke the action of the executable process to the process management system from over the established connection.

23. The system of claim 19, wherein the one or more user interfaces accept as input commands to poll the process management system for status information, and sends requests to poll the process management system for status information from over the established connection.

24. The system of claim 19, wherein the one or more user interfaces receive messages from the process management system over the established connection in response to the polling.

25. The system of claim 24, wherein the messages contain information that is descriptive of the primary node.

26. The system of claim 24, wherein the messages contain information that is descriptive of a particular event that occurs during the execution of the process.

27. The system of claim 24, wherein the messages contain a data structure that is generated as a result of the execution of the script code by the one or more script engines to indicate the status of the executable process.

28. The system of claim 19, wherein the process management system accepts connection requests from one or more user interfaces operating on one or more nodes associated with the process management system over an established connection.

29. The system of claim 28, wherein the one or more nodes include the primary node.

30. The system of claim 19, wherein the process management system receives requests to invoke the action of the executable process from the one or more nodes connected to the process management system.

31. The system of claim 19, wherein the process management system continuously polls the one or more nodes connected to the process management system to obtain status information related to the executable process.

32. The system of claim 19, wherein the process management system stores the status information relative to the process into a private data structure that is accessible to only script threads in operation during process execution.

33. The system of claim 19, wherein the process management system stores the status information relative to the executable process into a status value data structure that is accessible to the one or more nodes having access to the status information.

34. The system of claim 33, wherein the status value data structure contains data for providing an indication of a particular event that occurs during the execution of the process.

35. The system of claim 19, wherein the process management system receives requests for status information relative to the executable process from the one or more nodes connected to the process management system.

36. The system of claim 19, wherein the process management system sends the public data structure to the one or more nodes in response to the request.

37. The system of claim 19, wherein the process management system sends the status value data structure to the one or more nodes in response to the request.

* * * * *